United States Patent [19]
Nagata

[11] Patent Number: 4,783,117
[45] Date of Patent: Nov. 8, 1988

[54] SUNROOF FOR AUTOMOTIVE VEHICLES

[75] Inventor: Kazuhisa Nagata, Okazaki, Japan

[73] Assignees: Aisin Seiki Kabushiki Kaisha, Kariya; Toyota Jidosha Kabushiki Kaisha, Toyota, both of Japan

[21] Appl. No.: 41,529

[22] Filed: Apr. 23, 1987

[30] Foreign Application Priority Data

Apr. 28, 1986 [JP] Japan .................... 61-63303[U]

[51] Int. Cl.$^4$ ............................... B60J 7/195
[52] U.S. Cl. ........................... 296/216; 49/493
[58] Field of Search ............... 296/216, 221, 222; 49/493

[56] References Cited

U.S. PATENT DOCUMENTS

| | | | |
|---|---|---|---|
| 3,939,608 | 2/1976 | Asaki et al. | 49/488 |
| 4,018,476 | 4/1977 | Lutz et al. | 296/222 X |
| 4,312,534 | 1/1982 | Jardin et al. | 296/216 |
| 4,418,956 | 12/1983 | Yamamoto et al. | 296/216 |
| 4,509,791 | 4/1985 | Bienert et al. | 296/216 |
| 4,553,307 | 11/1985 | Kaltz et al. | 296/222 X |
| 4,671,565 | 6/1987 | Grimm et al. | 296/216 |

FOREIGN PATENT DOCUMENTS 2318391 10/1974 Fed. Rep. of Germany ...... 296/222

Primary Examiner—Dennis M. Pedder
Attorney, Agent, or Firm—Finnegan, Henderson, Farabow, Garrett & Dunner

[57] ABSTRACT

A sunroof for opening and closing a window formed in the roof of an automobile including a transparent or opaque plate, a strip fixed to the peripheral edge of the plate, a sealing member fitted onto the strip, a downwardly projecting bead formed on the bottom surface of the strip on the rearward edge thereof, and a metal reinforcing plate secured to the bead for supporting the sealing member and raising the rigidity of the strip and plate.

4 Claims, 3 Drawing Sheets

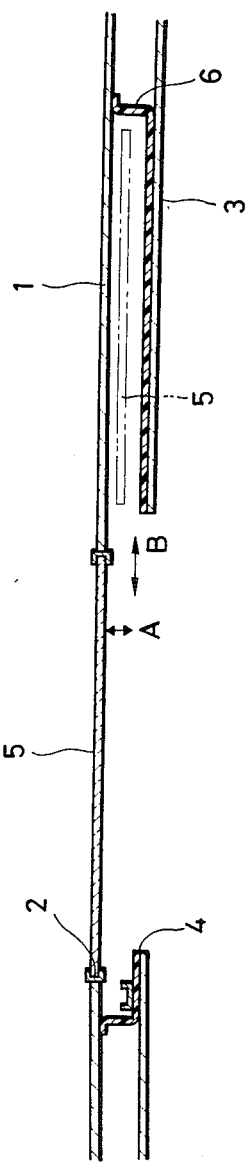
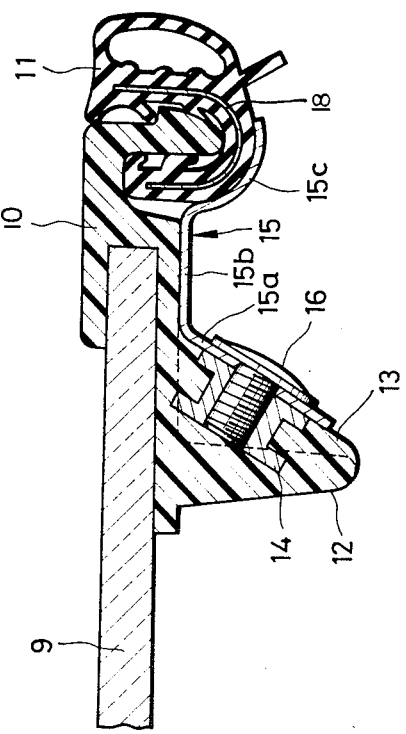
FIG. 2 PRIOR ART
FIG. 4

SUNROOF FOR AUTOMOTIVE VEHICLES

FIELD OF THE INVENTION

The present invention relates to a sunroof for an automotive vehicle with increased strength.

BACKGROUND OF THE INVENTION

Conventionally, automotive vehicle sunroofs consist of glass or a synthetic resin and include a strip which is fitted on its four sides at its edges. The strip is provided with a seal so that when closing the window opening formed in the roof of the vehicle the sunroof forms a hermetic seal between the sunroof and the window opening. Drive means is employed to raise and lower the sunroof to open and close the window opening. To close the window opening, first the forward part of the sunroof is raised to a predetermined position, then the rearward part of the sunroof is raised so that the seal on the rearward edge of the sunroof is urged strongly against the corresponding rearward edge of the window opening. Although the strong urging pressure is desirable for hermetically sealing the joint between the sunroof and window opening, deformation of the sunroof results because the rearward side of the sunroof is caused to bend or flex. As a result the quality of the hermetic seal between the sunroof and window opening, especially on the rearward side of the sunroof is eventually diminished.

SUMMARY OF THE INVENTION

An objective of the present invention is to provide a sunroof having improved rigidity for preventing deformation, thereby assuring an excellent seal between the sunroof and window opening.

To achieve the above and other objectives and in accordance with the purpose of the invention, as embodied and broadly described herein, a sunroof for opening and closing a window formed in a stationary roof of an automotive vehicle according to the present invention, comprises a plate having a peripheral edge, a strip fixed to the peripheral edge of the plate, a sealing member fitted onto the strip, a downwardly projecting bead formed on a bottom surface of the strip on a rearward edge and, a metal reinforcing plate secured to the bead for supporting the sealing member.

The bead on the rearward edge of the strip and the reinforcing plate cooperate to prevent the deformation of the sunroof. In addition to improving the rigidity of the strip and the plate, the reinforcing plate increases the strength of the fit between the sealing and the strip to prevent the sealing member from falling off the strip.

DESCRIPTION OF THE DRAWINGS

The accompanying drawings which are incorporated in and constitute a part of this specification, illustrate one embodiment of the invention and together with the description serve to explain the principles of the invention.

FIG. 2 shows a sectional view of FIG. 1 taken along line II—II;

FIG. 4 shows a sectional view of FIG. 3 taken along line IV—IV.

DESCRIPTION OF THE PREFERRED EMBODIMENT

Figure 1:
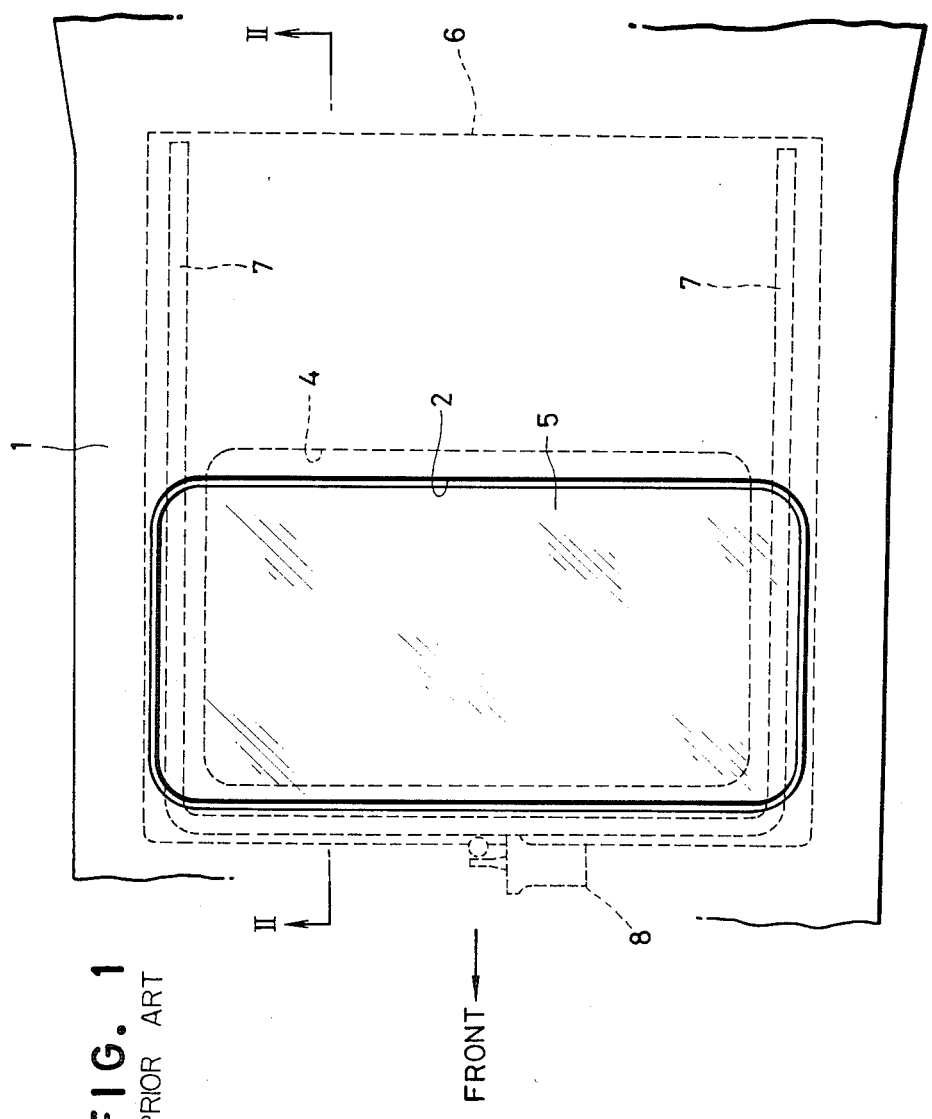
FIG. 1 shows a partial plan view illustrating a conventional sunroof structure according to the prior art.

FIGS. 1 and 2 illustrate the general structure of a conventional housing for a sliding-type sunroof adaptable to an automotive vehicle such as an automobile. The vehicle has a stationary roof 1 provided in the forward portion with a window opening 2 a decorative panel 3 installed in the passenger compartment and contains an panel opening 4. Thus, passenger compartment communicates with the atmosphere through the window opening 2 and panel opening 4. A sliding-type sunroof 5 is arranged to open and close the window opening 2 so that the passenger compartment may selectively communicate with the atmosphere. As shown in FIG. 2, the sunroof 5 can be raised or lowered and moved back or forth as indicated by arrows A and B respectively. This is achieved by means of a powered or manual drive unit 8 (FIG. 1) which opens and closes the window opening 2. The phantom lines in FIG. 2 show the sunroof 5 in the fully retracted state, while the solid lines show the sunroof fitted sungly into the window opening 2 to close the same.

Attached to the stationary roof 1, between the roof and the decorative panel 3, is a housing 6 provided with an opening sized to that of the panel opening 4 and including a pair of guide rails 7 attached thereto for guiding the motion of the sunroof 5. The window opening 2 is uncovered by disengaging the sunroof 5 and sliding it along the guiding rails 7. The housing 6 then internally receives and accommodates the sunroof 5.

The sunroof 5 has a strip fitted on the edges of its four sides. The strip includes a sealing member to form a hermetic seal between the sunroof 5 and window opening 2 when the sunroof 5 is shut to close the window opening. When the window opening 2 is to be closed, the forward part of the sunroof 5 is raised to a predetermined position, then the rearward part of the sunroof is raised so that the sealing member on its rearward edge is urged strongly against the corresponding rearward edge of the window opening. The difficulty encountered here is that the strong urging pressure causes the rearward side of the sunroof 5 to bend or flex, resulting in sunroof deformation. Eventually, the quality of the hermetic seal between the sunroof 5 and window opening 2 deteriorates, especially on the rearward side of the sunroof.

Figure 3:
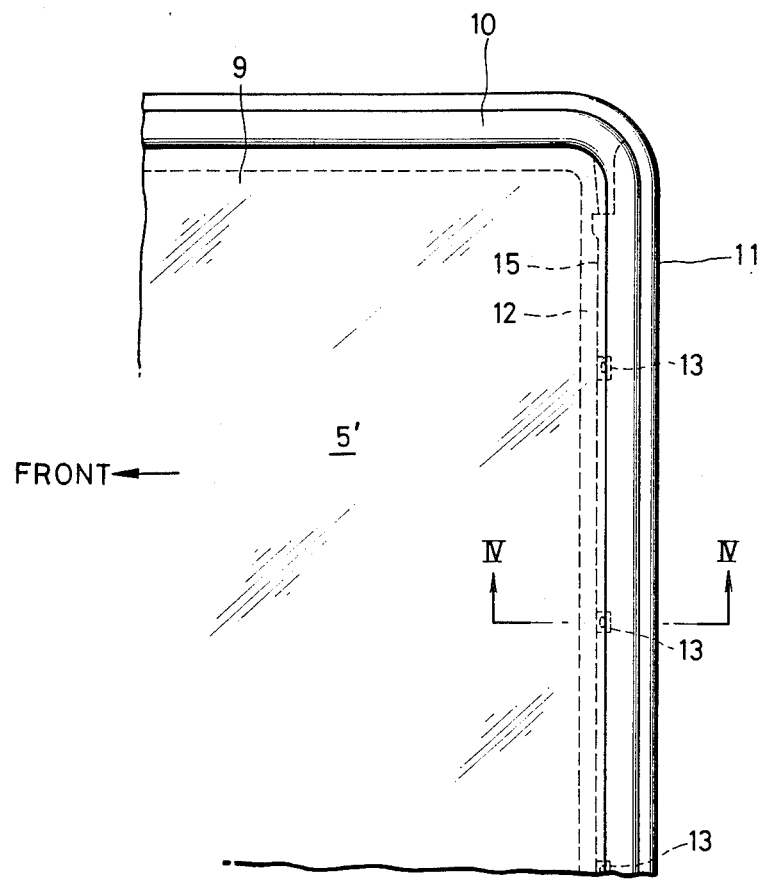
FIG. 3 shows a partial plan view of a preferred embodiment of a sunroof including the rearward portion of the sunroof according to the present invention.

The present invention is directed to solving the foregoing problem and will now be described in detail with reference to FIGS. 3 and 4.

The sunroof of the invention, shown at numeral 5', comprises a plate 9 made of transparent, or opaque glass or synthetic resin. A strip 10 is fitted onto the edge of the plate 9 on all four sides thereof, and a sealing member 11 having a thin plate 18 embedded therein is fitted onto the strip 10. The strip 10 consists of a resin material. The strip 10 includes a bottom surface, an inner peripheral edge, and, an outer peripheral edge having a vertically extending leg. A downwardly projecting bead 12 having an outer side surface is formed on the bottom surface and along the inner peripheral edge of the strip. The bead 12 is provided with suitably spaced thickened portions 13 into which a nut 14 is imbedded at the time the strip 10 is molded.

A metal reinforcing plate 15 is provided along the bead 12. The plate 15 forms three portions: a portion 15a opposing the outer side surface of the bead 12; a portion 15b contacting the bottom surface of the strip 10; and a portion 15c having an arcuate cross section and supporting the bottom surface of the sealing member 11. Screws 16 are screwed into respective ones of the nuts 14 to secure the reinforcing plate 15 to the bead 12.

The reinforcing plate 15 cooperates with the bead 12 to raise the rigidity of the strip 10 and the rearward edge of the plate 9, thereby preventing deformation of the strip 10 and plate 9. Additionally, since the reinforcing plate 15 supports the bottom side of the sealing member 11, the fit between the strip 10 and the sealing member 11 is strengthened to prevent the sealing member 11 from slipping off the strip 10.

It is intended that the specification and examples be considered as exemplary only, with the true scope and spirit of the invention being indicated by the following claims.

What is claimed is:

1. A sunroof for opening and closing a window formed in a stationary roof of an automotive vehicle, comprising:
    a plate having a peripheral edge including an upper and lower surface;
    a strip fixed to the peripheral edge of said plate for contacting upper and lower surfaces thereof and having a bottom surface, an inner peripheral edge, and an outer peripheral edge with a vertically extending leg;
    a sealing member fitted onto and surrounding said vertically extending leg;
    a downwardly projecting bead formed on said bottom surface of said strip along said inner peripheral edge thereof; and,
    a metal reinforcing plate underlying and supporting said sealing member and secured to said beam for supporting said sealing member.

2. The sunroof according to claim 1 wherein said reinforcing plate comprises:
    a three portion metal reinforcing plate including:
    a portion opposing an outer side surface of said bead;
    a portion contacting the bottom surface of said strip; and
    a portion supporting a bottom surface of said sealing member.

3. A sunroof for opening and closing a window formed in a stationary roof of an automotive vehicle, comprising:
    a plate having a peripheral edge;
    a strip fixed to the peripheral edge of said plate and, having a bottom surface and an inner peripheral edge;
    a sealing member fitted onto said strip and having a thin plate embedded therein;
    a downwardly projecting bead formed on said bottom surface of said strip along said inner peripheral edge; and,
    a metal reinforcing plate releasably secured to said bead and underlying and supporting a bottom surface of said sealing member.

4. The sunroof according to claim 3 wherein said metal reinforcing plate comprises:
    a three portion metal reinforcing plate including:
    a portion opposing an outer side surface of said bead;
    a portion contacting said bottom surface of said strip; and
    a portion supporting said bottom surface of said sealing member.

* * * * *